US010681252B2

(12) United States Patent
Tokiwa et al.

(10) Patent No.: US 10,681,252 B2
(45) Date of Patent: Jun. 9, 2020

(54) DIGITAL CAMERA INCLUDING FOCAL PLANE SHUTTER

(71) Applicant: FUJIFILM Corporation, Tokyo (JP)

(72) Inventors: Kentaro Tokiwa, Saitama (JP); Takeshi Misawa, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/164,529

(22) Filed: Oct. 18, 2018

(65) Prior Publication Data

US 2019/0052783 A1 Feb. 14, 2019

Related U.S. Application Data

(63) Continuation of application No. PCT/JP2017/016380, filed on Apr. 25, 2017.

(30) Foreign Application Priority Data

Apr. 28, 2016 (JP) ................................ 2016-090832

(51) Int. Cl.
*H04N 5/225* (2006.01)
*H04N 5/235* (2006.01)
(Continued)

(52) U.S. Cl.
CPC ............ *H04N 5/2254* (2013.01); *G03B 9/36* (2013.01); *G03B 17/02* (2013.01); *G03B 17/14* (2013.01);
(Continued)

(58) Field of Classification Search
CPC ........ G03B 17/02; G03B 17/14; G03B 17/18; G03B 17/563; G03B 9/36; H04N 5/225;
(Continued)

(56) References Cited

U.S. PATENT DOCUMENTS 7,435,017 B2 * 10/2008 Tsukatani .............. G03B 17/02 348/371
8,956,060 B2 * 2/2015 Shintani ................ G03B 17/14 396/529
(Continued)

FOREIGN PATENT DOCUMENTS

JP 61-183631 A 8/1986
JP 1-205134 A 8/1989
(Continued)

OTHER PUBLICATIONS

DP Review Website: https://www.dpreview.com/articles/9084727509/pentax645d Pentax unveils 40MP 645D medium format DSLR Published Mar. 10, 2010 pp. 1-2 & p. 5.*
(Continued)

*Primary Examiner* — Twyler L Haskins
*Assistant Examiner* — Akshay Trehan
(74) *Attorney, Agent, or Firm* — Birch, Stewart, Kolasch & Birch, LLP

(57) ABSTRACT

There is provided a digital camera of which the stable operation of a shutter can be performed by compact structure and which can suppress the generation of vibration caused by the operation of a shutter. A grip portion (22) is provided at one end portion of a camera body (10), and a charge section (124) of a focal-plane shutter unit (110) is disposed within a range GA of the grip portion (22). Further, a battery is disposed between an image sensor and a display unit at an end portion of the camera body opposite to the grip portion (22). Since the charge section is disposed within the range of the grip portion, a drive section (122) and the charge section (124) can be disposed close to each other. Accordingly, a drive unit for a focal-plane shutter can be made compact, and a shutter curtain can be charged with a stable operation even in a case in which the shutter curtain is to be charged with large torque. Further, since a portion of the camera
(Continued)

body, which is close to the center of rotation of a shutter curtain, can be gripped with a hand at the time of handheld imaging, the generation of vibration can be effectively suppressed.

10 Claims, 10 Drawing Sheets

(51) Int. Cl.
*G03B 17/02* (2006.01)
*G03B 17/18* (2006.01)
*G03B 17/56* (2006.01)
*G03B 17/14* (2006.01)
*G03B 9/36* (2006.01)

(52) U.S. Cl.
CPC ........... *G03B 17/18* (2013.01); *G03B 17/563* (2013.01); *H04N 5/225* (2013.01); *H04N 5/22525* (2018.08); *H04N 5/2353* (2013.01)

(58) Field of Classification Search
CPC . H04N 5/22525; H04N 5/2254; H04N 5/2353
USPC ................................ 396/452, 456, 535, 539
See application file for complete search history.

(56) References Cited

U.S. PATENT DOCUMENTS

| | | | | |
|---|---|---|---|---|
| 2005/0207747 | A1 | 9/2005 | Hirota | |
| 2008/0174678 | A1 * | 7/2008 | Solomon | G02B 27/0025 348/231.99 |
| 2009/0086087 | A1 * | 4/2009 | Kikuchi | H01M 8/04208 348/372 |
| 2010/0060771 | A1 * | 3/2010 | Shintani | G03B 13/02 348/333.01 |
| 2011/0050952 | A1 | 3/2011 | Kosaka | |
| 2015/0168816 | A1 * | 6/2015 | Fujiwara | G03B 17/563 348/375 |

FOREIGN PATENT DOCUMENTS

| | | | | |
|---|---|---|---|---|
| JP | H01205134 | * | 8/1989 | G03B 9/36 |
| JP | 4-57830 | U | 5/1992 | |
| JP | 5-210164 | A | 8/1993 | |
| JP | 9-146145 | A | 6/1997 | |
| JP | 2003-15191 | A | 1/2003 | |
| JP | 2003015191 | * | 1/2003 | G03B 17/02 |
| JP | 2003-69878 | A | 3/2003 | |
| JP | 2005-259655 | A | 9/2005 | |
| JP | 2005-266209 | A | 9/2005 | |
| JP | 2007-279270 | A | 10/2007 | |
| JP | 2010-21963 | A | 1/2010 | |
| JP | 2010-92028 | A | 4/2010 | |
| JP | 2011-48058 | A | 3/2011 | |
| JP | 2011048058 | * | 3/2011 | G03G 9/36 |

OTHER PUBLICATIONS

German Office Action, dated May 28, 2019, for corresponding German Application No. 112017001419.0, along with an English translation.
International Preliminary Report on Patentability (form PCT/IPEA/409), with a completion date of Mar. 29, 2018, for corresponding International Application No. PCT/JP2017/016380, along with an English translation.
International Search Report and Written Opinion of the International Searching Authority (forms PCT/ISA/210 and PCT/ISA/237), dated Aug. 1, 2017, for corresponding International Application No. PCT/JP2017/016380, with an English translation of the International Search Report.
German Office Action dated Jul. 18, 2019, for German Patent Application No. 11 2017 001 375.5, with English translation.
International Preliminary Report on Patentability and Written Opinion of the International Searching Authority (Forms PCT/IB/326, PCT/IB/373, and PCT/ISA/237) for International Application No. PCT/JP2017/016002, dated Nov. 8. 2018, with English translation.
International Search Report (form PCT/ISA/210) for International Application No. PCT/JP2017/016002 dated Jul. 25, 2017, with English translation.

* cited by examiner

DIGITAL CAMERA INCLUDING FOCAL PLANE SHUTTER

CROSS-REFERENCE TO RELATED APPLICATIONS

The present application is a Continuation of PCT International Application No. PCT/JP2017/016380 filed on Apr. 25, 2017 claiming priority under 35 U.S.C § 119(a) to Japanese Patent Application No. 2016-090832 filed on Apr. 28, 2016. Each of the above applications is hereby expressly incorporated by reference, in their entirety, into the present application.

BACKGROUND OF THE INVENTION

1. Field of the Invention

The present invention relates to a digital camera, and more particularly, to a digital camera that comprises a square focal-plane shutter.

2. Description of the Related Art

Most of lens-interchangeable cameras employ a focal-plane shutter as a shutter. The focal-plane shutter is a shutter that is installed immediately in front of a focal plane. The focal-plane shutter comprises two shutter curtains, that is, a front curtain and a rear curtain, and controls an exposure time by a change in an interval (slit) between the two shutter curtains and the travel speeds thereof.

Focal-plane shutters can be broadly classified into three types of focal-plane shutters, that is, a drum type focal-plane shutter, a square focal-plane shutter, and a rotary focal-plane shutter in accordance with mechanisms thereof. At present, a square focal-plane shutter is a main type.

A square focal-plane shutter is a focal-plane shutter that includes a shutter curtain formed of a plurality of thin sheet-like shutter blades arranged side by side. In a case in which the shutter curtain is closed, an interval between the shutter blades is widened and light passing through the exposure aperture is blocked. In a case in which the shutter curtain is opened, the shutter blades are folded so as to overlap with each other and are retreated to a region outside the exposure aperture. The shutter blades forming the shutter curtain are supported by an arm member, and are moved in parallel to each other by the rotation of the arm member. Since the shutter curtain travels in an up-down direction to open and close the exposure aperture, the square focal-plane shutter is also called an up-down travel focal-plane shutter, a vertical travel focal-plane shutter, and the like. Further, the square focal-plane shutter is also called a blade type focal-plane shutter or the like due to the shape of the shutter blade of the shutter curtain.

JP1997-146145A (JP-H09-146145A) proposes a camera comprising a square focal-plane shutter for which a drive unit is disposed at a joint portion between a camera body and a grip portion for a reduction in the size of the entire digital camera.

Further, JP2003-15191A proposes a digital camera comprising a square focal-plane shutter for which a drive mechanism is disposed closer to an imaging element than the operation plane of shutter blades for a reduction in the size of the entire digital camera.

Further, JP2005-266209A proposes a digital camera comprising a square focal-plane shutter for which a drive mechanism is disposed in a region opposite to a grip portion for a reduction in the size of the entire digital camera.

SUMMARY OF THE INVENTION

A camera using a focal-plane shutter has a problem that vibration is likely to be generated at the time of operation of a shutter (so-called shutter shock). This problem becomes significant as the size of an image sensor is increased. Further, this problem becomes significant as the weight of the camera is reduced.

Since the cameras disclosed in JP1997-146145A (JP-H09-146145A), JP2003-15191A, and P2005-266209A do not include measures against vibration to be generated at the time of the operation of a shutter, there is a drawback that the shake of the cameras is likely to occur. This will be described in more detail. Most of shake of the camera is caused by shake except for the shake of the camera caused by the operation of a shutter. Vibration caused by shake is vibration having a low frequency in the range of about 1 to 15 Hz. This kind of vibration having a low frequency can be reduced to about a fraction thereof in a case in which a general image stabilization technology is used.

However, since vibration caused by the operation of the shutter is generated by a reaction force against the instant stop of the shutter blades traveling at high speed, the frequency of the vibration is much higher than the frequency of vibration caused by shake. Accordingly, even though a technique optimized for the correction of a frequency region of shake is used, vibration caused by the operation of the shutter cannot be significantly reduced.

Particularly, a medium-format camera includes an exposure aperture larger than that of a 35 mm-format camera. Accordingly, in a case in which a focal-plane shutter is used, vibration caused by the operation of the shutter becomes significant. That is, since the travel distance of the shutter blade is also lengthened in a case in which the exposure aperture is increased in size, the travel energy of the shutter blade is also increased (travel energy is increased in proportion to the square of the travel distance) as that much. As a result, since a reaction force to be generated at the time of stop is increased, the vibration of a level, which cannot be ignored just as it is, is generated.

Further, in recent years, the pixel size of an image sensor used in a digital camera has become much smaller than the size of a silver halide particle of a silver halide film (about 1/10 of the size of a silver halide particle). Accordingly, even though the image sensors have the same screen size, an influence of shake of the camera on the digital camera is more significant than that on a silver halide camera.

The invention has been made in consideration of the above-mentioned circumstances, and an object of the invention is to provide a digital camera of which the stable operation of a shutter can be performed by light and compact structure and which can suppress the transmission of vibration, which is caused by the operation of a shutter of which an influence becomes significant as the size of an image sensor is increased, to a camera.

Means for achieving the above-mentioned object are as follows.

(1) A digital camera comprising:

a camera body that includes a grip portion at one end portion thereof;

a lens or a lens mount that is provided on a front of the camera body;

a display unit that is provided on a back of the camera body;

an image sensor that is provided in the camera body;

a focal-plane shutter unit which is square and includes a base plate including an exposure aperture, a shutter curtain opening and closing the exposure aperture, a drive section driving the shutter curtain in an openable and closable manner, and a charge section charging a driving force of the drive section and disposed at one end portion of the base plate, and the focal-plane shutter unit being disposed immediately in front of the image sensor in the camera body and the charge section being disposed within a range of the grip portion; and a battery that is disposed between the image sensor and the display unit in the camera body, and is disposed at an end portion of the camera body opposite to the end portion of the camera body including the grip portion.

According to this aspect, the grip portion is provided at one end portion of the camera body, and the charge section of the focal-plane shutter unit is disposed within the range of the grip portion. Further, the battery is disposed between the image sensor and the display unit at an end portion of the camera body opposite to the grip portion. Since the charge section is disposed within the range of the grip portion, the drive section and the charge section can be disposed close to each other. Accordingly, a drive unit for a focal-plane shutter can be made compact, and a shutter curtain can be charged with a stable operation even in a case in which the shutter curtain is to be charged with large torque. Further, since the drive section and the charge section can be disposed close to each other, a portion of the camera body, which is close to the center of rotation of the shutter curtain, can be gripped with a hand at the time of handheld imaging. Accordingly, the generation of vibration can be effectively suppressed. That is, since the major cause of vibration is moment that is received at the time of braking of the shutter curtain (moment received about the center of rotation of the shutter curtain), a portion of the camera body, which is close to the center of rotation of the shutter curtain, is gripped with a hand. Accordingly, the generation of vibration can be effectively suppressed. Further, since the battery is disposed at an end portion of the camera body opposite to the grip portion, the moment of inertia about the grip portion can be increased. Accordingly, the generation of vibration can be more effectively suppressed. This will be described in more detail. According to this aspect, a layout where the center of rotation of the shutter curtain is made close to the grip portion and the battery is disposed on the opposite of the center of rotation of the camera can be made. However, in a case in which such a layout is employed, the battery, which is a heavy object, can be disposed at a position distant from the center of rotation of the shutter curtain. Even though mass points have the same mass, the moment of inertia of the mass point, which is more distant from the center of rotation, about a rotation axis is larger. Accordingly, in a case in which the battery, which is a heavy object, is disposed at a position distant from the center of rotation of the shutter curtain, rotational moment about the rotating shaft of the shutter curtain (rotational moment about an axis parallel to the optical axis positioned along the rotating shaft of the shutter curtain) can be increased. Since vibration, which is caused by the operation of the shutter, is generated about the rotating shaft of the shutter curtain, the moment of inertia in a direction where vibration caused by the operation of the shutter is to be suppressed can be increased by an increase in the rotational moment about the rotating shaft of the shutter curtain. As a result, since it is possible to make it difficult for vibration, which is caused by the operation of the shutter, to be transmitted to the camera, the occurrence of shake of the camera can be effectively suppressed. Further, according to this aspect, since the battery is disposed between the image sensor and the display unit, the dimension of the camera body in the lateral direction can also be reduced.

(2) The digital camera according to (1), wherein the camera body includes a body portion thicker than the grip portion, the lens or the lens mount is disposed on a front of the body portion, the display unit is disposed on a back of the body portion, and the image sensor and the battery are disposed within a range of the body portion.

According to this aspect, the camera body is provided with the body portion thicker than the grip portion. Further, the body portion is provided with the lens or the lens mount, the display unit, the image sensor, and the battery. Accordingly, gripping ability can be improved while the entire camera is made compact.

(3) The digital camera according to (1) or (2), wherein the charge section and the drive section of the focal-plane shutter unit are disposed in parallel.

According to this aspect, the charge section and the drive section are disposed in parallel. Accordingly, the charge section and the drive section can be disposed close to each other. In this case, the drive section is disposed between the exposure aperture and the charge section.

(4) The digital camera according to any one of (1) to (3), further comprising:

a battery chamber that is provided in the camera body and stores the battery, wherein the battery is stored in the battery chamber.

According to this aspect, the battery chamber is provided in the camera body. Accordingly, the battery can be attachably and detachably loaded.

(5) The digital camera according to (4), wherein the camera body includes a battery insertion opening that is provided on an end face of the end portion of the camera body opposite to the end portion of the camera body including the grip portion and is used to load the battery in the battery chamber.

According to this aspect, the battery insertion opening, which is used to load the battery in the battery chamber, is provided on an end face of the end portion of the camera body opposite to the grip portion. Accordingly, the battery can be easily attached and detached.

(6) The digital camera according to (4) or (5), wherein the camera body includes a cover part that is provided on the end face of the end portion of the camera body opposite to the end portion of the camera body including the grip portion and opens and closes the battery chamber.

According to this aspect, the cover part, which opens and closes the battery chamber, is provided on the end face of the end portion of the camera body opposite to the grip portion. Accordingly, the battery can be easily attached and detached.

(7) The digital camera according to any one of (1) to (6), further comprising:

a board on which an electronic component is mounted, wherein the board is disposed between the image sensor and the display unit in the camera body and includes a cut-out portion provided at a position of the battery to be disposed.

According to this aspect, the board, which is disposed between the image sensor and the display unit, is provided with the cut-out portion, and the battery is disposed in the cut-out portion.

(8) The digital camera according to any one of (1) to (7), wherein the charge section of the focal-plane shutter unit is disposed in the grip portion.

According to this aspect, the charge section is disposed in the grip portion. The grip portion is provided at one end portion of the camera body. Accordingly, in a case in which the charge section is disposed in the grip portion, the dimension of the camera body in the lateral direction can be reduced.

(9) The digital camera according to any one of (1) to (8), wherein the image sensor has a sensor size that is larger than that of an image sensor having a 35 mm-format full size.

According to this aspect, the image sensor, which has a sensor size larger than that of an image sensor having a 35 mm-format full size, is provided. Since vibration to be generated at the time of operation of the shutter is increased as the size of the sensor is increased, the invention more effectively acts as the size of the image sensor is increased.

The image sensor having a 35 mm-format full size is an image sensor having a size corresponding to 135-film (35 mm film). The image sensor has a screen size of about 24 mm×36 mm (length×width).

(10) The digital camera according to (9), wherein the image sensor is an image sensor having a medium-format size.

According to this aspect, the image sensor is formed of an image sensor having a medium-format size. A medium-format size is a size corresponding to Brownie film. The screen size (sensor size) of an image sensor corresponding to a 6×4.5 format is about 33 mm×40 mm (length×width).

(11) The digital camera according to any one of (1) to (10), wherein the digital camera is a non-reflex digital camera.

According to this aspect, the digital camera is formed of a non-reflex digital camera. A non-reflex digital camera is a digital camera not including a reflex mirror for guiding a ray, which incomes from a lens, to an optical view finder. A non-reflex digital camera is also called a mirrorless digital camera, a mirrorless camera, or the like. Since a mirror box, a pentaprism, and the like are not required in the case of a non-reflex digital camera, the entire non-reflex digital camera can be reduced in weight and can be made compact. Since vibration to be generated at the time of operation of the shutter becomes significant as the camera is reduced in weight, the invention more effectively functions as the camera is reduced in weight.

According to the invention, the stable operation of a shutter can be performed by light and compact structure. Further, the transmission of vibration, which is caused by the operation of a shutter of which an influence becomes significant as the size of an image sensor is increased, to a camera can be suppressed.

DESCRIPTION OF THE PREFERRED EMBODIMENTS

A preferred embodiment of the invention will be described in detail below with reference to the accompanying drawings.

<<Appearance>>

Figure 4:
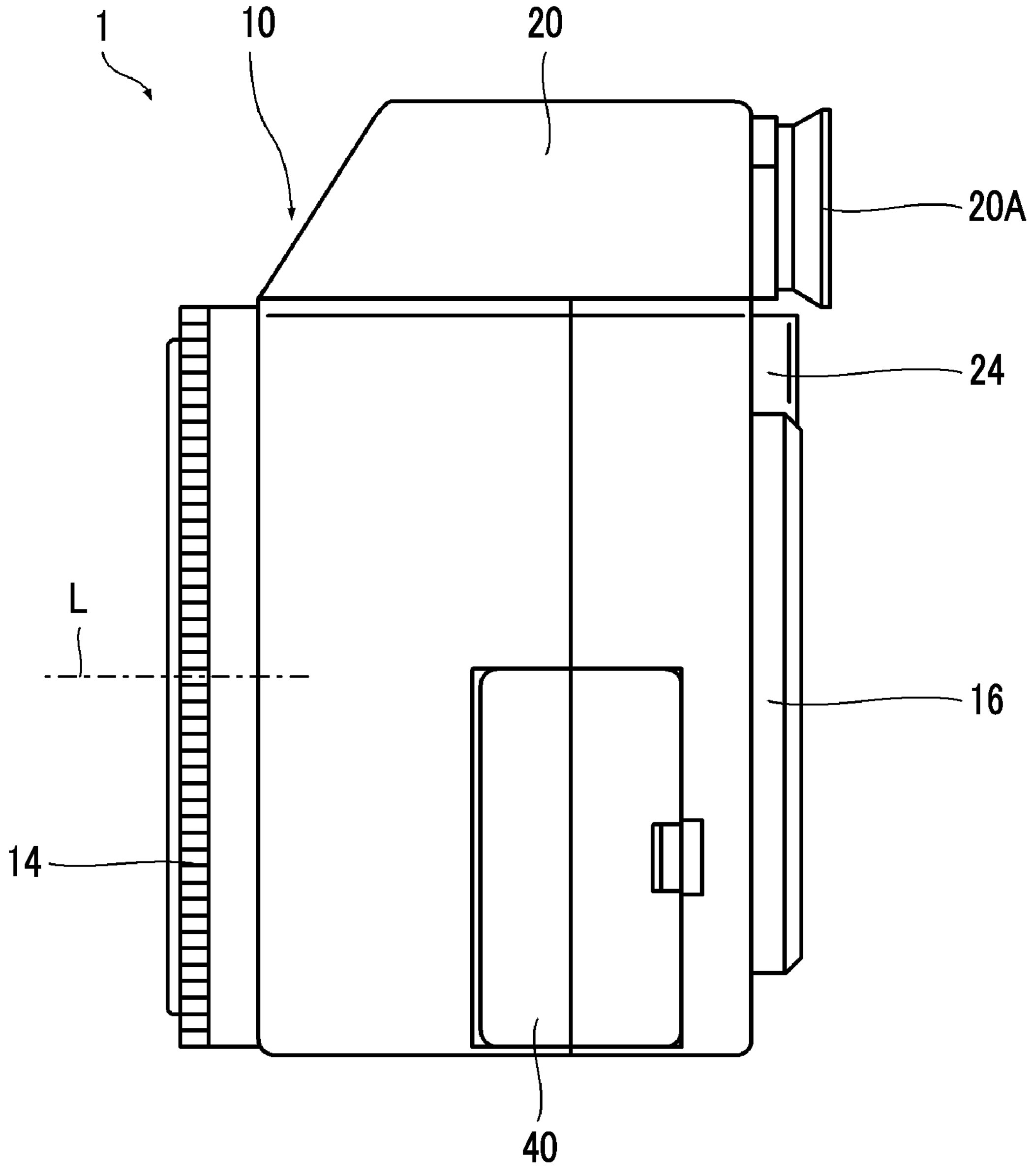
FIG. 4 is a left side view showing the appearance of the digital camera.
Figure 5:
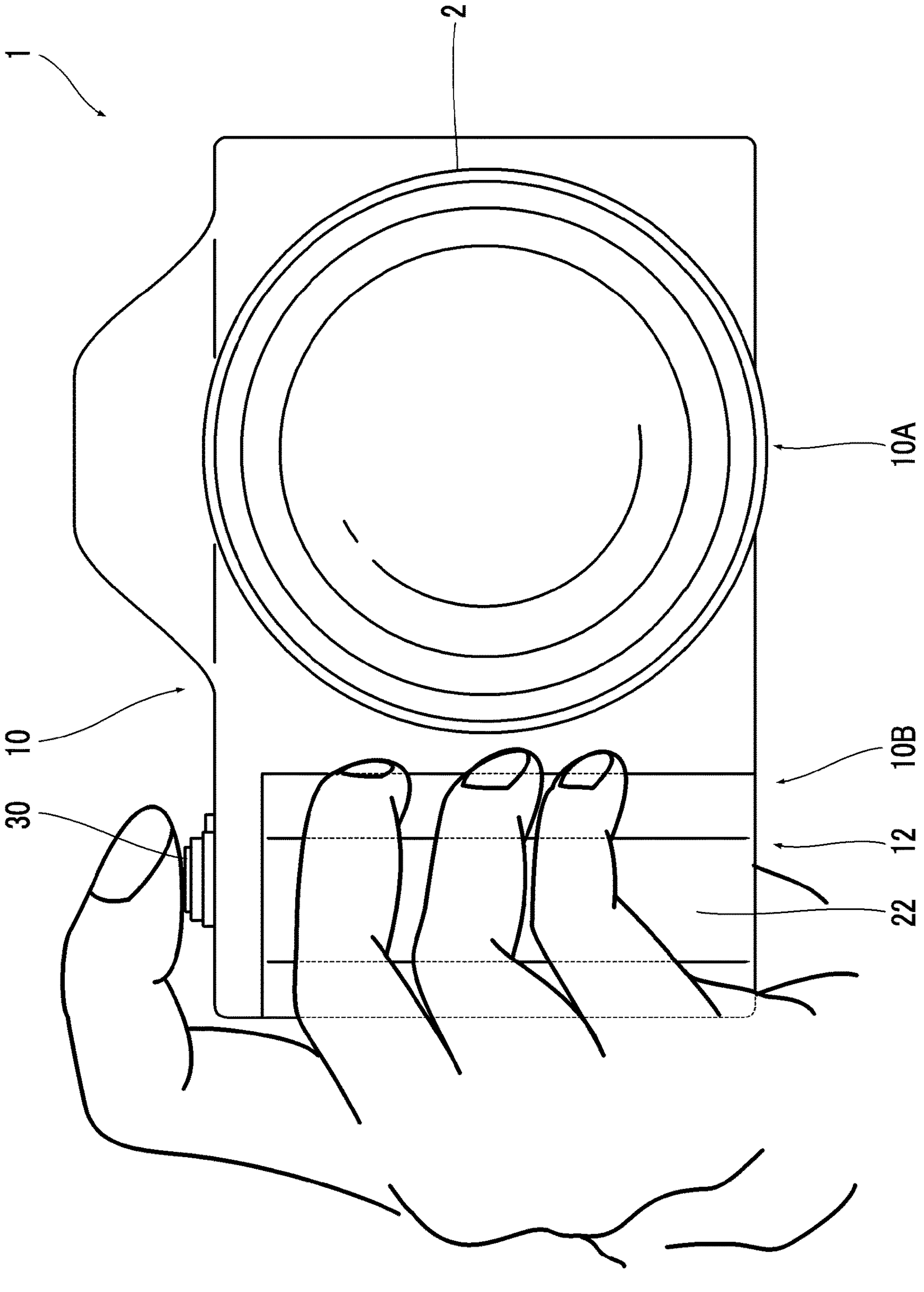
FIG. 5 is a front view showing a state in which the digital camera is gripped at the time of handheld imaging.
Figure 6:
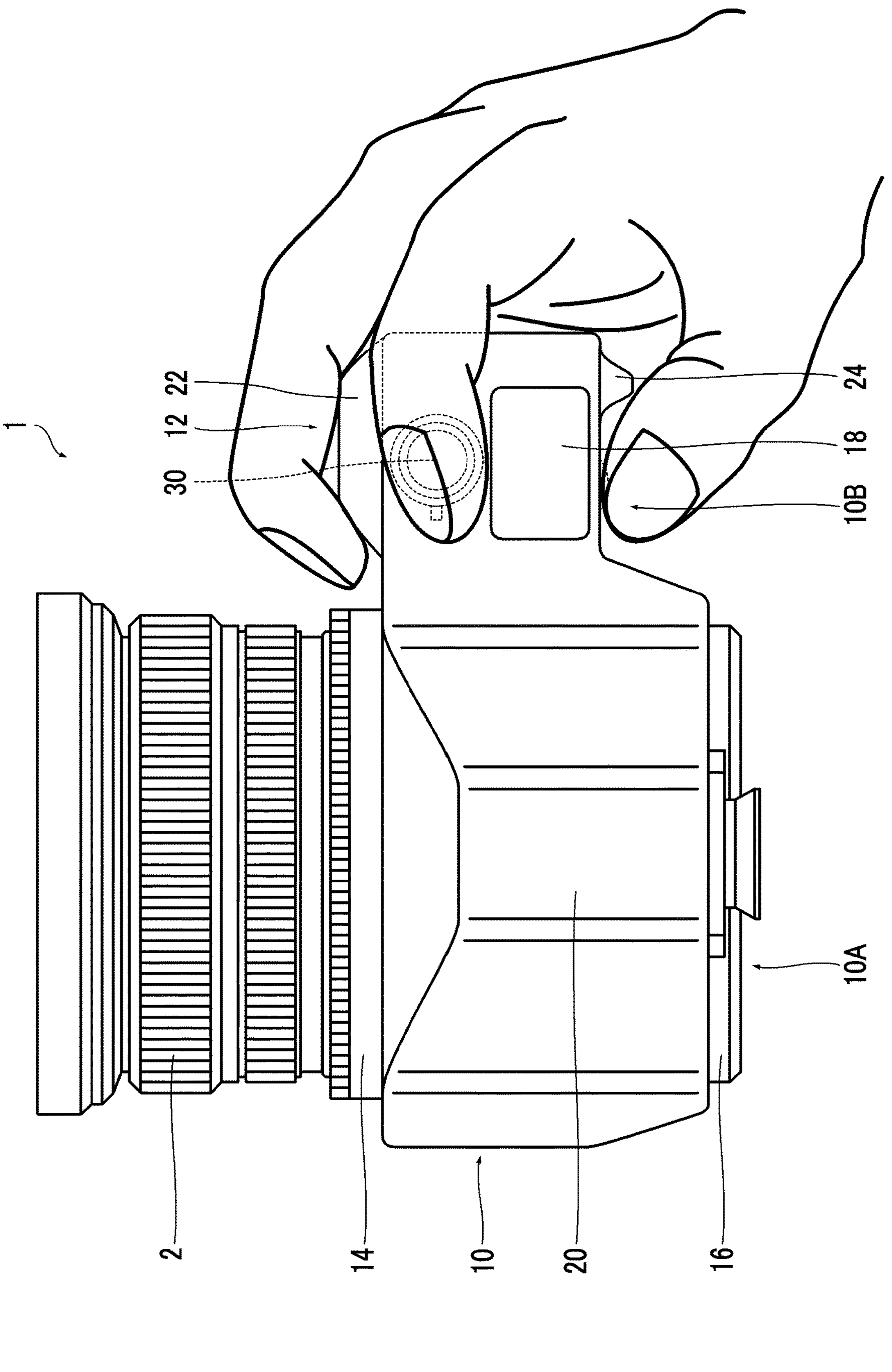
FIG. 6 is a top view showing a state in which the digital camera is gripped at the time of handheld imaging.

FIGS. 1, 2, 3, and 4 are a front view, a top view, a back view, and a left side view showing the appearance of a digital camera, respectively. Further, FIGS. 5 and 6 are a front view and a top view showing a state in which the digital camera is gripped at the time of handheld imaging, respectively.

In this specification, a direction along an optical axis L is referred to as a front-rear direction and a subject side is referred to as a front side. Further, in a plane orthogonal to the optical axis L, a direction along a long side of an image sensor 70 (an x direction in FIG. 1) is referred to as a lateral direction or a left-right direction and a direction along a short side of the image sensor 70 (a y direction in FIG. 1) is referred to as a vertical direction or an up-down direction.

A digital camera 1 of this embodiment is a lens-interchangeable medium-format digital camera, and is a non-reflex digital camera.

A lens-interchangeable digital camera is a digital camera of which a lens can be interchanged. Further, a medium-format digital camera is a digital camera that uses an image sensor having a medium-format size as an image sensor. A medium-format size is a size corresponding to Brownie film. An image sensor having a medium-format size has a screen size that is larger than that of an image sensor having a 35 mm-format full size. The screen size of an image sensor having a 35 mm-format full size is about 24 mm×36 mm (length×width). In the digital camera 1 of this embodiment, an image sensor having a screen size (sensor size) of about 33 mm×40 mm (length×width) is used as an image sensor corresponding to a 6×4.5 format.

A non-reflex digital camera is a digital camera not including a reflex mirror for guiding a ray, which incomes from a lens, to an optical view finder.

As shown in FIGS. 1 to 4, the digital camera 1 comprises a camera body 10 on which a lens can be mounted. FIGS. 1 to 4 show a state in which a lens 2 is removed, and FIGS. 5 and 6 show a state in which the lens 2 is mounted.

The camera body 10 is provided with a lens mount 14 on which the lens 2 is to be mounted, a main display 16, a sub-display 18, an electronic view finder 20, various operation buttons, a battery cover 40, and the like.

<Camera Body>

Figure 1:
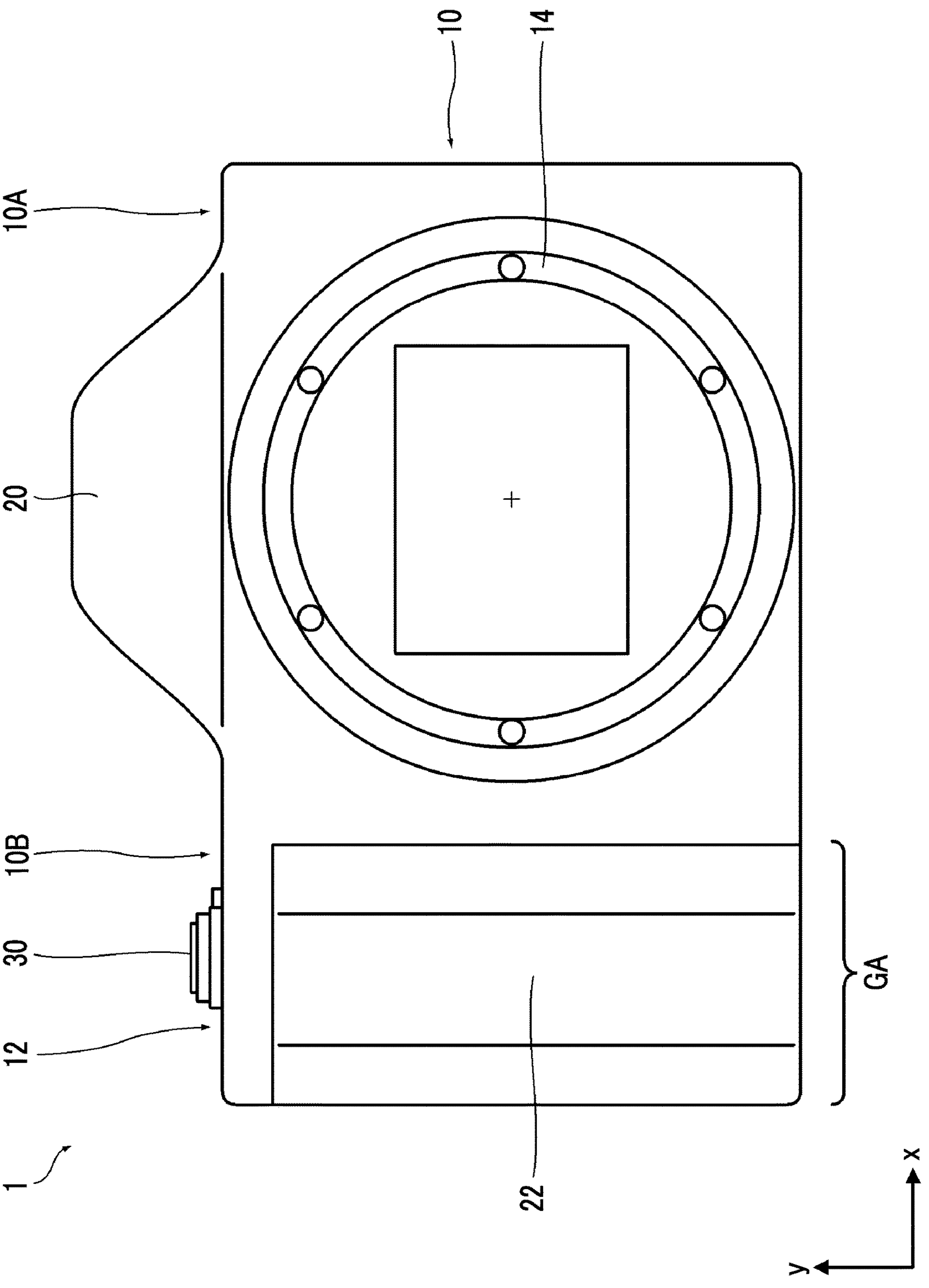
FIG. 1 is a front view showing the appearance of a digital camera.

The camera body 10 includes a body portion 10A and a projecting portion 10B, and has a laterally long shape in front view as shown in FIG. 1. The bottom of the camera body 10 is parallel to the long side of the image sensor 70.

The body portion 10A has the shape of a rectangular parallelepiped box that is rounded as a whole. The projecting portion 10B is provided on one side of the body portion 10A, and has a shape where a part of the body portion 10A projects in the lateral direction. The projecting portion 10B is thinner than the body portion 10A, and functions as a grip region at the time of handheld imaging.

An end portion of the projecting portion 10B is formed as a grip portion 12. The grip portion 12 is a portion that is to be gripped by a user at the time of handheld imaging. The grip portion 12 is formed to be thinner than the body portion 10A.

The grip portion 12 is provided with a grip 22 on the front side of the camera body 10. The grip 22 is formed as a protruding portion that protrudes forward in a trapezoidal shape. As shown in FIGS. 5 and 6, a user catches the grip 22 with fingers to grip the camera body 10 at the time of handheld imaging.

Further, the grip portion 12 is provided with a thumb rest 24 on the back side of the camera body 10. The thumb rest 24 is formed as a protruding portion that protrudes rearward in a convex shape. As shown in FIGS. 5 and 6, a user puts a thumb on the thumb rest 24 to grip the camera body 10 at the time of handheld imaging.

<Lens Mount>

The lens mount 14 is a portion on which the lens is to be mounted. As shown in FIG. 1, the lens mount 14 is provided on the front of the camera body 10. The lens mount 14 is disposed substantially at the center of the body portion 10A of the camera body 10.

<Main Display>

Figure 2:
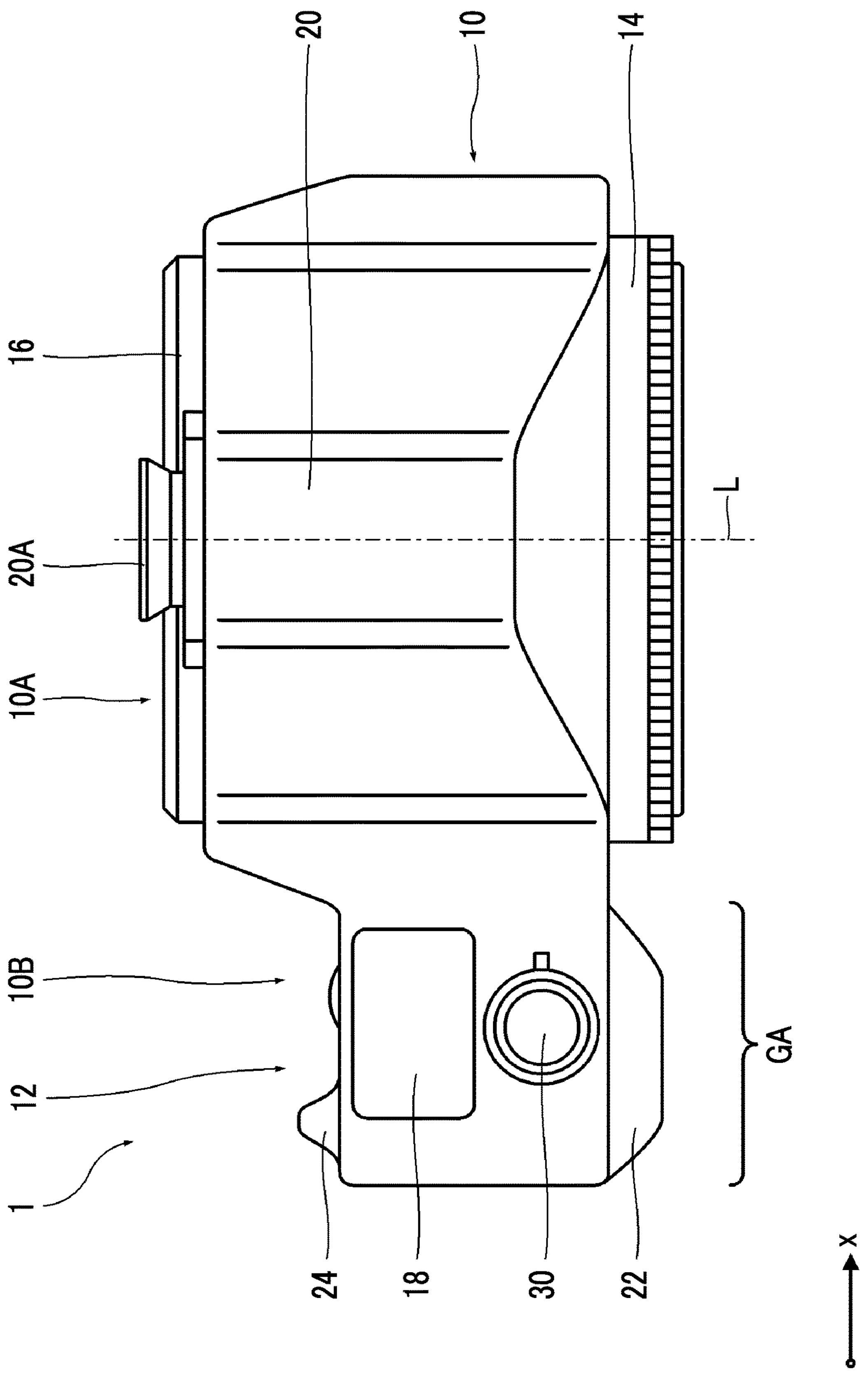
FIG. 2 is a top view showing the appearance of the digital camera.
Figure 3:
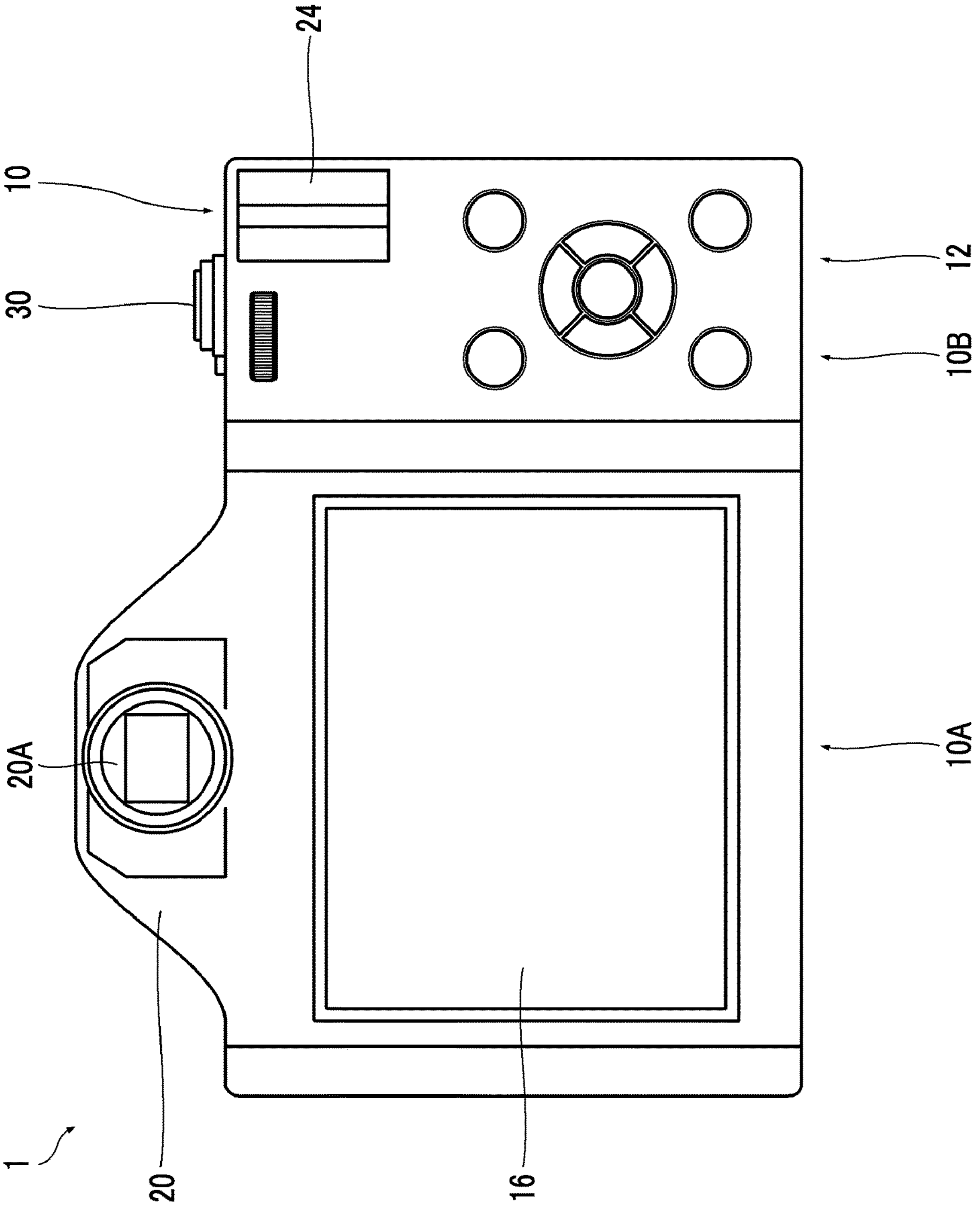
FIG. 3 is a back view showing the appearance of the digital camera.

The main display 16 is a large-screen display used to display images and the like, and is provided on the back of the camera body 10 as shown in FIG. 2. The main display 16 is disposed substantially at the center of the body portion 10A of the camera body 10. The main display 16 is formed of a color liquid crystal display (LCD).

<Sub-Display>

The sub-display 18 is a small-screen display that is used to display the settings of the camera, and the like. The sub-display 18 is provided on the upper surface (top surface) of the camera body 10. The sub-display 18 is provided on the projecting portion 10B of the camera body 10. The sub-display 18 is formed of, for example, a reflective LCD comprising an illuminator.

<Electronic View Finder>

The electronic view finder 20 is provided on the body portion 10A of the camera body 10, and is disposed at the upper surface portion of the body portion 10A. The electronic view finder 20 includes an eyepiece portion 20A on the back side of the camera body 10.

<Operation Buttons>

The camera body 10 is provided with various operation buttons, which are used to operate the digital camera 1, in addition to a shutter button 30.

The shutter button 30 is an operation member that is used to instruct imaging to be performed. The shutter button 30 is formed of a so-called two-stage switch that is to be half pressed and fully pressed. In a case in which the shutter button 30 is half pressed, the measurement of light, the measurement of a distance, or the like is performed. In a case in which the shutter button 30 is fully pressed, main imaging is performed. The shutter button 30 is disposed at a position where the shutter button 30 can be operated by a forefinger in a case in which a user grips the camera body 10. In the digital camera 1 of this embodiment, the shutter button 30 is disposed on the upper surface of the camera body 10.

The other operation buttons include a power supply lever that turns on/off the power supply of the digital camera 1, a menu button that calls up a menu screen, a cross button, an OK button, a cancel button, a play button, a delete button, a command dial, and the like.

<Battery Cover>

The battery cover 40 is a cover part that is used to open and close a battery insertion opening 90A of a battery chamber 90. The battery chamber 90 will be described later. As shown in FIG. 4, the battery cover 40 is provided on the end face (right side surface in the FIG. 1) of the body portion 10A. That is, the battery cover 40 is provided on the end face of the body portion opposite to the grip portion 12.

<<Internal Structure>>

Figure 7:
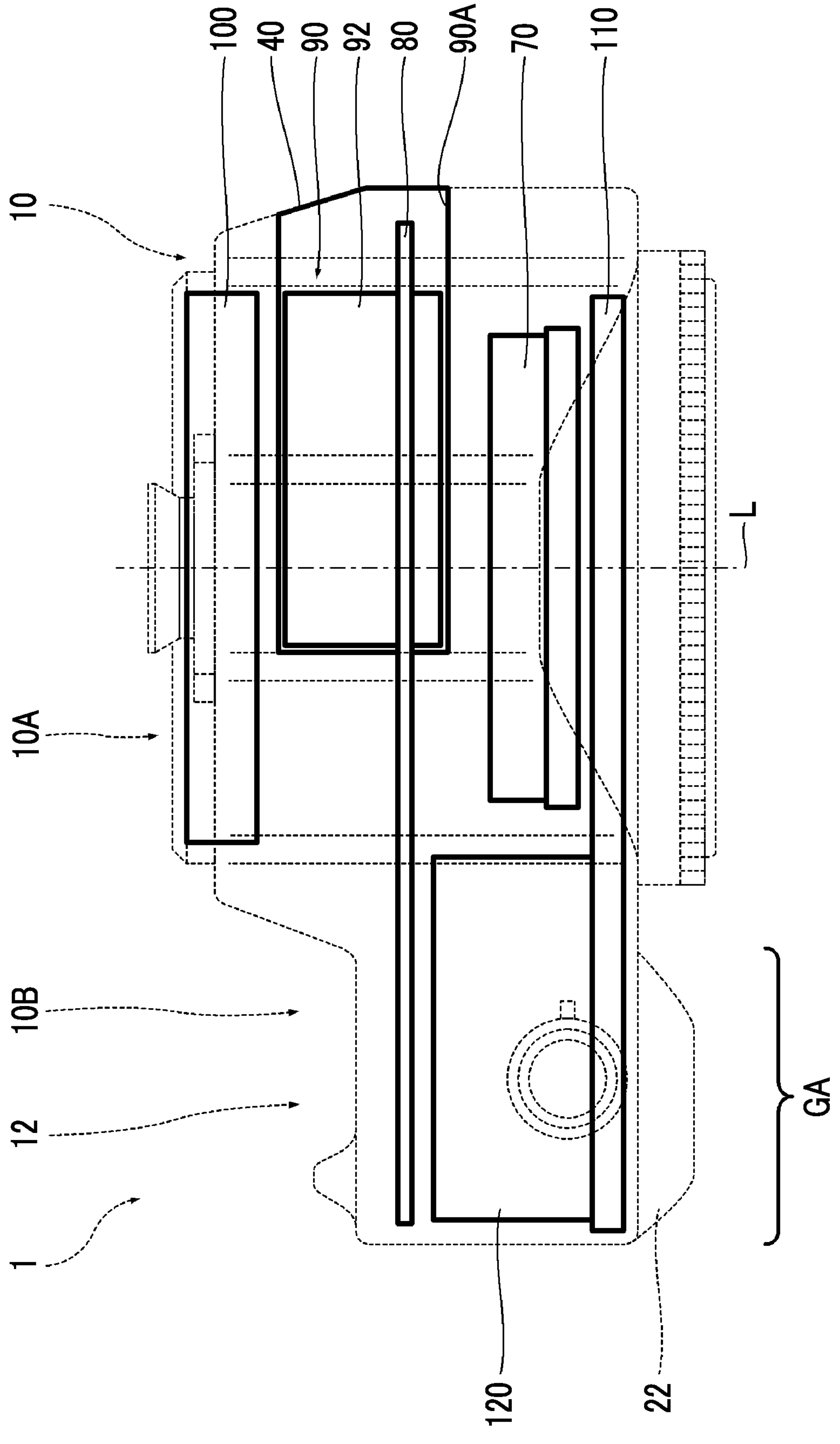
FIG. 7 is a top perspective view showing the schematic internal structure of the digital camera.

FIG. 7 is a top perspective view showing the schematic internal structure of the digital camera.

The digital camera 1 is provided with an image sensor 70, a main board 80, a battery chamber 90, a display unit 100, a focal-plane shutter unit 110, and the like in the camera body 10.

<Image Sensor>

The image sensor 70 is disposed on the optical axis. As described above, an image sensor having a medium-format size is used as the image sensor 70. A color image sensor having a screen size of about 33 mm×40 mm (length×width) is used in the digital camera 1 of this embodiment.

Publicly known image sensors, such as a charged coupled device (CCD) image sensor and a complementary metal oxide semiconductor (CMOS) image sensor, can be used as the image sensor 70.

<Main Board>

The main board 80 is a board as a main component of the digital camera 1, and various electronic components are mounted on the main board 80. The main board 80 is disposed between the image sensor 70 and the display unit 100. Detailed disposition of the main board 80 will be described later.

<Battery Chamber>

Figure 8:
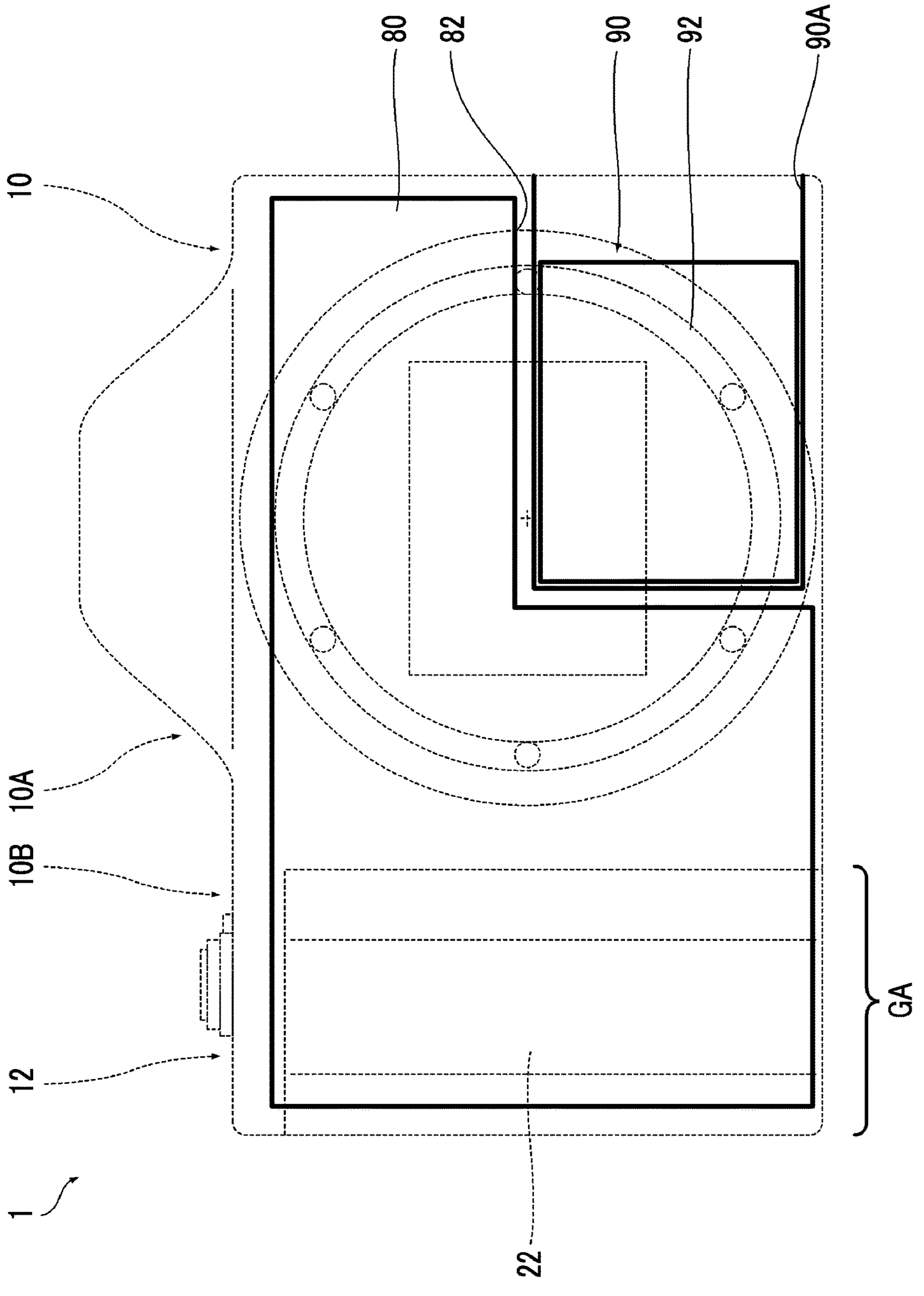
FIG. 8 is a front perspective view showing a structure in which a battery chamber is disposed.

FIG. 8 is a front perspective view showing a structure in which the battery chamber is disposed.

The battery chamber 90 is a storage portion for a battery 92. The battery 92 of the digital camera 1 of this embodiment has the shape of a rectangular parallelepiped. The battery chamber 90 has the shape of a rectangular parallelepiped box corresponding to the shape of the battery 92. The battery chamber 90 is disposed between the image sensor 70 and the display unit 100, and is disposed at the end portion of the camera body opposite to the grip portion 12.

The battery 92 is loaded in the battery chamber 90 from the battery insertion opening 90A. The battery insertion opening 90A is provided on the end face of the end portion of the camera body 10 opposite to the end portion of the camera body 10 including the grip portion 12. The battery insertion opening 90A is provided with the battery cover 40 that can be opened and closed. The battery 92 is inserted from the battery insertion opening 90A in the lateral direction, and is loaded in the battery chamber 90.

A cut-out portion 82 is provided at the main board 80 so as to correspond to the position of the battery chamber 90 to be disposed. The battery chamber 90 is disposed within the cut-out portion 82.

<Display Unit>

The display unit 100 is a unit that forms the main display 16. As described above, the display unit 100 is formed of a color LCD. The display unit 100 is disposed on the back of the body portion 10A of the camera body 10.

<Focal-Plane Shutter Unit>

The focal-plane shutter unit 110 is a unit that forms a mechanical shutter of the digital camera 1. The focal-plane shutter unit 110 is square, and a shutter curtain of the focal-plane shutter unit 110 is formed of a plurality of shutter blades. The focal-plane shutter unit 110 is disposed immediately in front of the image sensor 70. Detailed disposition of the focal-plane shutter unit 110 will be described later.

Figure 9:
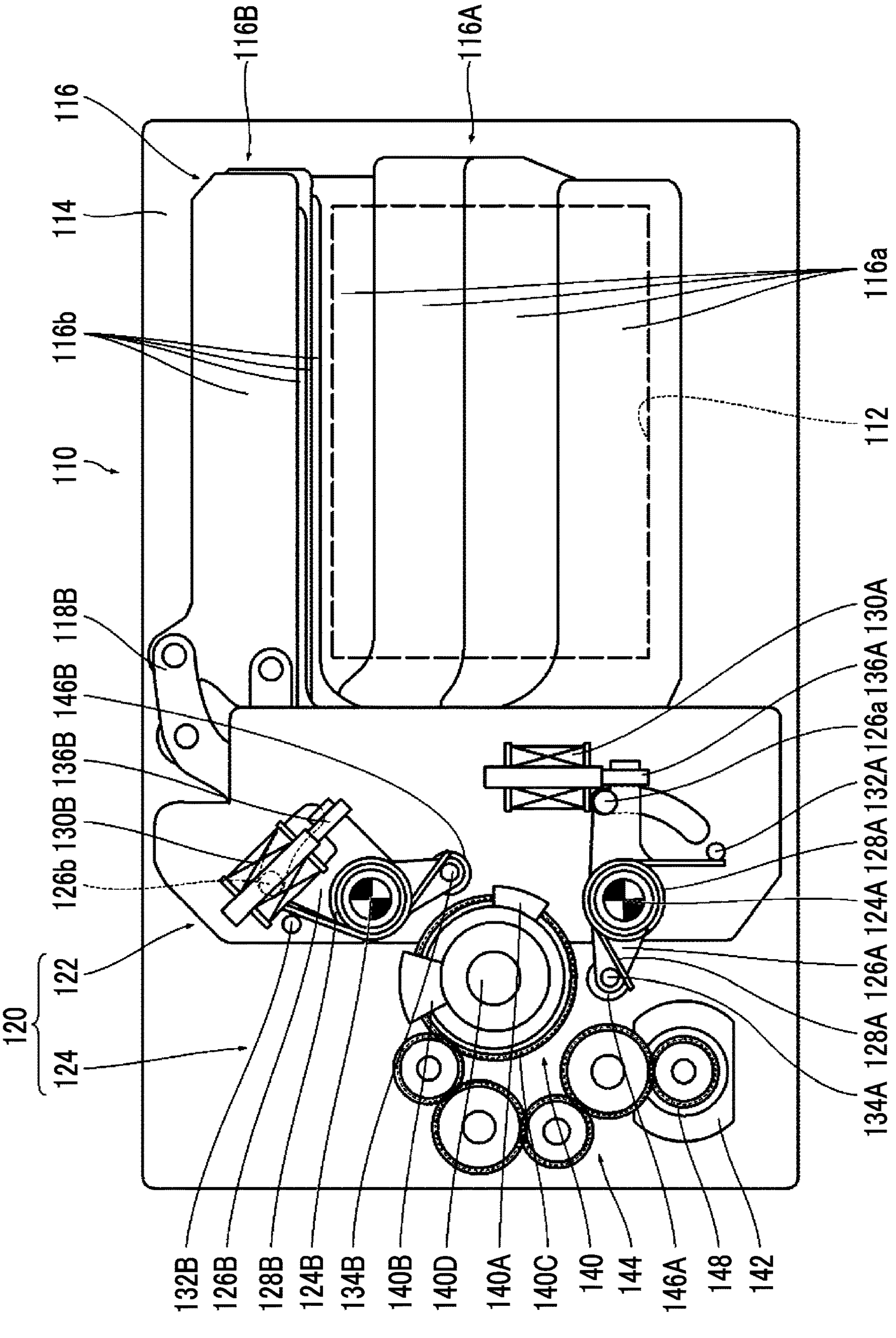
FIG. 9 is a front view showing the schematic structure of a focal-plane shutter unit.

FIG. 9 is a front view showing the schematic structure of the focal-plane shutter unit. FIG. 9 shows a state in which a front curtain is closed and a rear curtain is opened.

The focal-plane shutter unit 110 comprises a base plate 114 that includes an exposure aperture 112, a shutter curtain 116 that opens and closes the exposure aperture 112 of the base plate 114, and a drive unit 120 that drives the shutter curtain 116 in an openable and closable manner.

The base plate 114 has the shape of a rectangular flat plate. The exposure aperture 112 is provided at the base plate 114 as a rectangular opening portion. The exposure aperture 112 is provided at the right end of the base plate 114 in a case in which the exposure aperture 112 is viewed from the front. The size of the exposure aperture 112 is set to a size corresponding to the screen size of the image sensor 70.

The shutter curtain 116 includes a front curtain 116A and a rear curtain 116B. The front curtain 116A includes four shutter blades 116*a*, and the rear curtain 116B includes four shutter blades 116*b*.

The respective shutter blades 116*a* of the front curtain 116A are mounted on a front curtain-drive arm (not shown), and are moved in parallel to each other by the rotation (oscillation) of the front curtain-drive arm to open and close the exposure aperture 112.

As described above, FIG. 9 shows a state in which the front curtain 116A is closed. In a case in which the front curtain-drive arm is rotated clockwise from this state, the respective shutter blades 116*a* are folded so as to overlap with each other. As a result, the exposure aperture 112 is opened. Further, in a case in which the front curtain-drive arm is rotated counterclockwise from a state in which the exposure aperture 112 is opened, the respective shutter blades 116*a* are spread so that the interval of the respective shutter blades 116*a* is widened. As a result, the exposure aperture 112 is closed.

The respective shutter blades 116*b* of the rear curtain 116B are mounted on a rear curtain-drive arm 118B, and are moved in parallel to each other by the rotation (oscillation) of the rear curtain-drive arm 118B to open and close the exposure aperture 112.

As described above, FIG. 9 shows a state in which the rear curtain 116B is opened. In a case in which the rear curtain-drive arm is rotated clockwise from this state, the respective shutter blades 116*b* are spread so that the interval of the respective shutter blades 116*b* is widened. As a result, the exposure aperture 112 is closed. Further, in a case in which the rear curtain-drive arm 118B is rotated counterclockwise from a state in which the exposure aperture 112 is closed, the respective shutter blades 116*b* are folded so as to overlap with each other. As a result, the exposure aperture 112 is opened.

The drive unit 120 comprises a drive section 122 that drives the shutter curtain 116 in an openable and closable manner, and a charge section 124 that charges the driving force of the drive section 122. The drive unit 120 is provided at one end portion of the base plate 114, that is, at an end portion of the base plate 114 opposite to the exposure aperture 112.

[Drive Section]

The drive section 122 comprises a front curtain-drive shaft 124A that is a drive shaft for the front curtain 116A, a rear curtain-drive shaft 124B that is a drive shaft for the rear curtain 116B, a front curtain-drive lever 126A that rotationally drives the front curtain-drive arm, a rear curtain-drive lever 126B that rotationally drives the rear curtain-drive arm 118B, a front curtain-biasing spring 128A that biases the front curtain-drive lever 126A, a rear curtain-biasing spring 128B that biases the rear curtain-drive lever 126B, a front curtain-electromagnet 130A that holds the front curtain-drive lever 126A, a rear curtain-electromagnet 130E that holds the rear curtain-drive lever 126B, a front curtain-cushioning member (not shown) that cushions an impact generated at the time of stop of the front curtain 116A, and a rear curtain-cushioning member (not shown) that cushions an impact generated at the time of stop of the rear curtain 116B.

The front curtain-drive shaft 124A is a drive shaft for the front curtain 116A, and is the center of rotation of each of the shutter blades 116*a* of the front curtain 116A. The front curtain-drive arm on which the respective shutter blades 116*a* are mounted is rotatable relative to the front curtain-drive shaft 124A.

The rear curtain-drive shaft 124B is a drive shaft for the rear curtain 116B, and is the center of rotation of each of the shutter blades 116*b* of the rear curtain 116B. The rear curtain-drive arm 118B on which the respective shutter blades 116*b* are mounted is rotatable relative to the rear curtain-drive shaft 124B.

The front curtain-drive lever 126A is a member that rotationally drives the front curtain-drive arm. The front curtain-drive lever 126A is rotatably supported by the front curtain-drive shaft 124A. The front curtain-drive lever 126A includes a front curtain-drive pin 126*a*, and is connected to the front curtain-drive arm through the front curtain-drive pin 126*a*. In a case in which the front curtain-drive lever 126A is rotated about the front curtain-drive shaft 124A, the rotation of the front curtain-drive lever 126A is transmitted to the front curtain-drive arm through the front curtain-drive pin 126*a*. Accordingly, the front curtain-drive arm is rotated about the front curtain-drive shaft 124A.

The rear curtain-drive lever 126B is a member that rotationally drives the rear curtain-drive arm 118B. The rear curtain-drive lever 126B is rotatably supported by the rear curtain-drive shaft 124B. The rear curtain-drive lever 126B includes a rear curtain-drive pin 126*b*, and is connected to the rear curtain-drive arm 118B through the rear curtain-drive pin 126*b*. In a case in which the rear curtain-drive lever 126B is rotated about the rear curtain-drive shaft 124B, the rotation of the rear curtain-drive lever 126B is transmitted to the rear curtain-drive arm 118B through the rear curtain-drive pin 126*b*. Accordingly, the rear curtain-drive arm 118B is rotated about the rear curtain-drive shaft 124B.

The front curtain-biasing spring 128A is a member that biases the front curtain-drive lever 126A, and biases the front curtain-drive lever 126A in a direction where the front curtain 116A is to be opened. The direction where the front curtain 116A is to be opened is a clockwise direction around the front curtain-drive shaft 124A in FIG. 9. The front curtain-biasing spring 128A is formed of a torsion bar spring. The front curtain-drive shaft 124A is fitted into the inner peripheral portion of the front curtain-biasing spring 128A, so that the front curtain-biasing spring 128A is mounted on the front curtain-drive shaft 124A. One end of the front curtain-biasing spring 128A is caught by a spring bearing 132A provided on the base plate 114 and the other end of the front curtain-biasing spring 128A is caught by a spring bearing 134A provided on the front curtain-drive lever 126A, so that the front curtain-biasing spring 128A biases the front curtain-drive lever 126A clockwise.

The rear curtain-biasing spring 128B is a member that biases the rear curtain-drive lever 126B, and biases the rear curtain-drive lever 126B in a direction where the rear curtain 116B is to be closed. The direction where the rear curtain 116B is to be closed is a clockwise direction around the rear curtain-drive shaft 124B in FIG. 9. The rear curtain-biasing spring 128B is formed of a torsion bar spring. The rear curtain-drive shaft 124B is fitted into the inner peripheral portion of the rear curtain-biasing spring 128B, so that the rear curtain-biasing spring 128B is mounted on the rear curtain-drive shaft 124B. One end of the rear curtain-biasing spring 128B is caught by a spring bearing 132B provided on the base plate 114 and the other end of the rear curtain-biasing spring 128B is caught by a spring bearing 134B provided on the rear curtain-drive lever 126B, so that the rear curtain-biasing spring 128B biases the rear curtain-drive lever 126B clockwise.

The front curtain-electromagnet 130A is a member that holds the front curtain-drive lever 126A, and holds the front curtain-drive lever 126A in a state in which the front curtain 116A is closed. That is, the front curtain-electromagnet 130A holds the front curtain-drive lever 126A in a charged state. The front curtain-electromagnet 130A is provided on the base plate 114. The front curtain-drive lever 126A is provided with a magnetic piece 136A that is to be held by the front curtain-electromagnet 130A. In a case in which the front curtain-drive lever 126A is rotated to a position where the front curtain 116A is closed, the magnetic piece 136A comes into contact with the front curtain-electromagnet 130A. Accordingly, the magnetic piece 136A can be held by the front curtain-electromagnet 130A, and can be held in a state in which the front curtain 116A is closed.

The rear curtain-electromagnet 130B is a member that holds the rear curtain-drive lever 126B, and holds the rear curtain-drive lever 126B in a state in which the rear curtain 116B is opened. That is, the rear curtain-electromagnet 130B holds the rear curtain-drive lever 126B in a charged state. The rear curtain-electromagnet 130B is provided on the base plate 114. The rear curtain-drive lever 126B is provided with a magnetic piece 136B that is to be held by the rear curtain-electromagnet 130B. In a case in which the rear curtain-drive lever 126B is rotated to a position where the rear curtain 116B is closed, the magnetic piece 136B comes into contact with the rear curtain-electromagnet 130B. Accordingly, the magnetic piece 136B can be held by the rear curtain-electromagnet 130B, and can be held in a state in which the rear curtain 116B is opened.

The front curtain-cushioning member cushions an impact generated at the time of stop of the front curtain 116A. The front curtain-cushioning member is provided on the base plate 114. The front curtain-cushioning member comes into contact with the front curtain-drive pin at the end of travel of the front curtain 116A, and cushions an impact generated at the time of stop of the front curtain 116A.

The rear curtain-cushioning member cushions an impact generated at the time of stop of the rear curtain 116B. The rear curtain-cushioning member is provided on the base plate 114. The rear curtain-cushioning member comes into contact with the rear curtain-drive pin at the end of travel of the rear curtain 116B, and cushions an impact generated at the time of stop of the rear curtain 116B.

[Charge Section]

The charge section 124 charges the driving force of the drive section 122. That is, the charge section 124 winds up the front and rear curtains 116A and 116B against the biasing forces of the front and rear curtain-biasing springs 128A and 128B.

The charge section 124 is disposed adjacent to the drive section 122. Particularly, in the digital camera 1 of this embodiment, the drive section 122 and the charge section 124 are disposed in parallel, and the charge section 124 is disposed on the outside of the drive section 122. The outside of the drive section 122 means one side of the drive section 122 opposite to the exposure aperture 112. Since the charge section 124 is disposed adjacent to the drive section 122, the drive unit 120 can be made compact and large torque can be efficiently transmitted to the drive section 122. Particularly, since the digital camera 1 of this embodiment uses an image sensor having a medium-format size as the image sensor 70, the digital camera 1 of this embodiment has large torque for charging. Since the charge section 124 is disposed adjacent to the drive section 122, large torque can be efficiently transmitted to the drive section 122 while the drive unit 120 is made compact. Accordingly, the shutter curtains can be stably wound up.

The charge section 124 comprises a charge lever 140 that charges the front and rear curtains 116A and 116B, a charge motor 142, and a rotation transmission mechanism 144 that transmits the rotation of the charge motor 142 to the charge lever 140.

The charge lever 140 has a structure in which a front curtain-charge lever 140A charging the front curtain 116A, a rear curtain-charge lever 140B charging the rear curtain 116B, a charge gear 140C, and a rotating shaft 140D are integrated. The front curtain-charge lever 140A, the rear curtain-charge lever 140B, the charge gear 140C, and the rotating shaft 140D are arranged coaxially. The rotating shaft 140D is supported by bearings (not shown) provided on the base plate 114, so that the charge lever 140 is rotatably supported by the base plate 114. The rotation direction of the charge lever 140 is a clockwise direction in FIG. 9.

In a case in which the front curtain-charge lever 140A is rotated, the front curtain-charge lever 140A comes into contact with the front curtain-drive lever 126A and rotates the front curtain-drive lever 126A. The front curtain-drive lever 126A is provided with a roller 146A that is coaxial with the spring bearing 134A. In a case in which the front curtain-charge lever 140A is rotated, the front curtain-charge lever 140A comes into contact with the roller 146A and rotates the front curtain-drive lever 126A.

In a case in which the rear curtain-charge lever 140B is rotated, the rear curtain-charge lever 140B comes into contact with the rear curtain-drive lever 126B and rotates the rear curtain-drive lever 126B. The rear curtain-drive lever 126B is provided with a roller 146B that is coaxial with the spring bearing 134B. In a case in which the rear curtain-charge lever 140B is rotated, the rear curtain-charge lever 140B comes into contact with the roller 146B and rotates the rear curtain-drive lever 126B.

The charge motor 142 is provided on the base plate 114. The charge motor 142 includes a drive gear 148 on the output shaft thereof.

The rotation transmission mechanism 144 is formed of a gear train, and transmits rotation between the drive gear 148 and the charge gear 140C.

[Operation of Focal-Plane Shutter]

(1) Charge

Charge is performed by the driving of the charge motor 142. In a case in which the charge motor 142 is driven, the rotation of the output shaft of the charge motor 142 is transmitted to the charge gear 140C through the rotation transmission mechanism 144. Accordingly, the charge lever 140 is rotated. In this case, the charge lever 140 is rotated clockwise in FIG. 9.

In a case in which the charge lever 140 is rotated, the front curtain-charge lever 140A comes into contact with the roller 146A of the front curtain-drive lever 126A first and rotates the front curtain-drive lever 126A. In this case, the front curtain-drive lever 126A is rotated counterclockwise in FIG. 9. Further, the front curtain-drive lever 126A is rotated against the biasing force of the front curtain-biasing spring 128A.

In a case in which the front curtain-drive lever 126A is rotated, the front curtain-drive arm is also rotated. Accordingly, the front curtain 116A is closed.

In a case in which the front curtain-drive arm is rotated and the front curtain 116A is completely closed, the magnetic piece 136A of the front curtain-drive lever 126A comes into contact with the front curtain-electromagnet 130A. The front curtain-electromagnet 130A is driven at a timing when the magnetic piece 136A of the front curtain-drive lever 126A comes into contact with the front curtain-electromagnet 130A, so that the magnetic piece 136A is held by the front curtain-electromagnet 130A. Accordingly, the charge of the front curtain 116A is completed.

The rear curtain-charge lever 140B comes into contact with the roller 146B of the rear curtain-drive lever 126B at a timing when the front curtain 116A is closed, and rotates the rear curtain-drive lever 126B. In this case, the rear curtain-drive lever 126B is rotated counterclockwise in FIG. 9. Further, the rear curtain-drive lever 126B is rotated against the biasing force of the rear curtain-biasing spring 128B.

In a case in which the rear curtain-drive lever 126B is rotated, the rear curtain-drive arm 118B is also rotated. Accordingly, the rear curtain 116B is opened. In a case in which the rear curtain-drive arm 118B is rotated to a position where the rear curtain 116B is fully opened, the magnetic piece 136B of the rear curtain-drive lever 126B comes into contact with the rear curtain-electromagnet 130B. The rear curtain-electromagnet 130B is driven at a timing when the magnetic piece 136B of the rear curtain-drive lever 126B comes into contact with the rear curtain-electromagnet 130B, so that the magnetic piece 136B is held by the rear curtain-electromagnet 130B. Accordingly, the charge of the rear curtain 116B is completed.

(2) Exposure

Exposure is performed by an operation for closing the rear curtain 116B after opening the front curtain 116A.

First, the holding of the magnetic piece 136A performed by the front curtain-electromagnet 130A is released. Accordingly, the front curtain-drive lever 126A is rotated by the biasing force of the front curtain-biasing spring 128A. Then, the front curtain-drive arm is rotated while interlocking with the rotation of the front curtain-drive lever 126A. Accordingly, the front curtain 116A is opened.

After that, the holding of the magnetic piece 136B performed by the rear curtain-electromagnet 130B is released according to exposure time. Accordingly, the rear curtain-drive lever 126B is rotated by the biasing force of the rear curtain-biasing spring 128B. Then, the rear curtain-drive arm 118B is rotated while interlocking with the rotation of the rear curtain-drive lever 126B. Accordingly, the rear curtain 116B is closed.

<<Internal Layout>>

As described above, the image sensor 70, the main board 80, the battery chamber 90, the display unit 100, and the focal-plane shutter unit 110 are disposed in the camera body 10.

As shown in FIG. 7, the image sensor 70 is disposed on the optical axis L in the camera body. That is, the image sensor 70 is disposed so that the center of the light-receiving surface of the image sensor 70 is positioned on the optical axis L. Further, the image sensor 70 is disposed so that the light-receiving surface of the image sensor 70 is orthogonal to the optical axis L.

The display unit 100 is also disposed substantially on the optical axis L. As described above, the display unit 100 forms the main display 16 and is disposed on the back of the camera body 10. Since the position of the main display 16 to be disposed is in the body portion 10A of the camera body 10, the position of the display unit 100 to be disposed is also in the body portion 10A of the camera body 10.

The main board 80 is disposed between the image sensor 70 and the display unit 100. The main board 80 is disposed so as to be orthogonal to the optical axis L.

The battery chamber 90 is also disposed between the image sensor 70 and the display unit 100. Particularly, in the digital camera 1 of this embodiment, the battery chamber 90 is disposed close to an end portion of the camera body 10. The end portion, which is mentioned here, is the end portion of the camera body opposite to the grip portion 12. Accordingly, the battery 92, which is a heavy object, is disposed at the end portion of the camera body opposite to the grip portion 12.

Further, the battery chamber 90 is disposed in the rear of the focal-plane shutter unit 110. Accordingly, the dimension of the camera body 10 in the lateral direction can be reduced.

As shown in FIG. 8, the cut-out portion 82 is provided at the main board 80 so as to correspond to the position of the battery chamber 90 to be disposed. The battery chamber 90 is disposed within the cut-out portion 82.

The focal-plane shutter unit 110 is disposed immediately in front of the image sensor 70. The focal-plane shutter unit 110 is disposed so that the base plate 114 of the focal-plane shutter unit 110 is orthogonal to the optical axis L. Further, the focal-plane shutter unit 110 is disposed so that the center of the exposure aperture 112 is positioned on the optical axis L.

Figure 10:
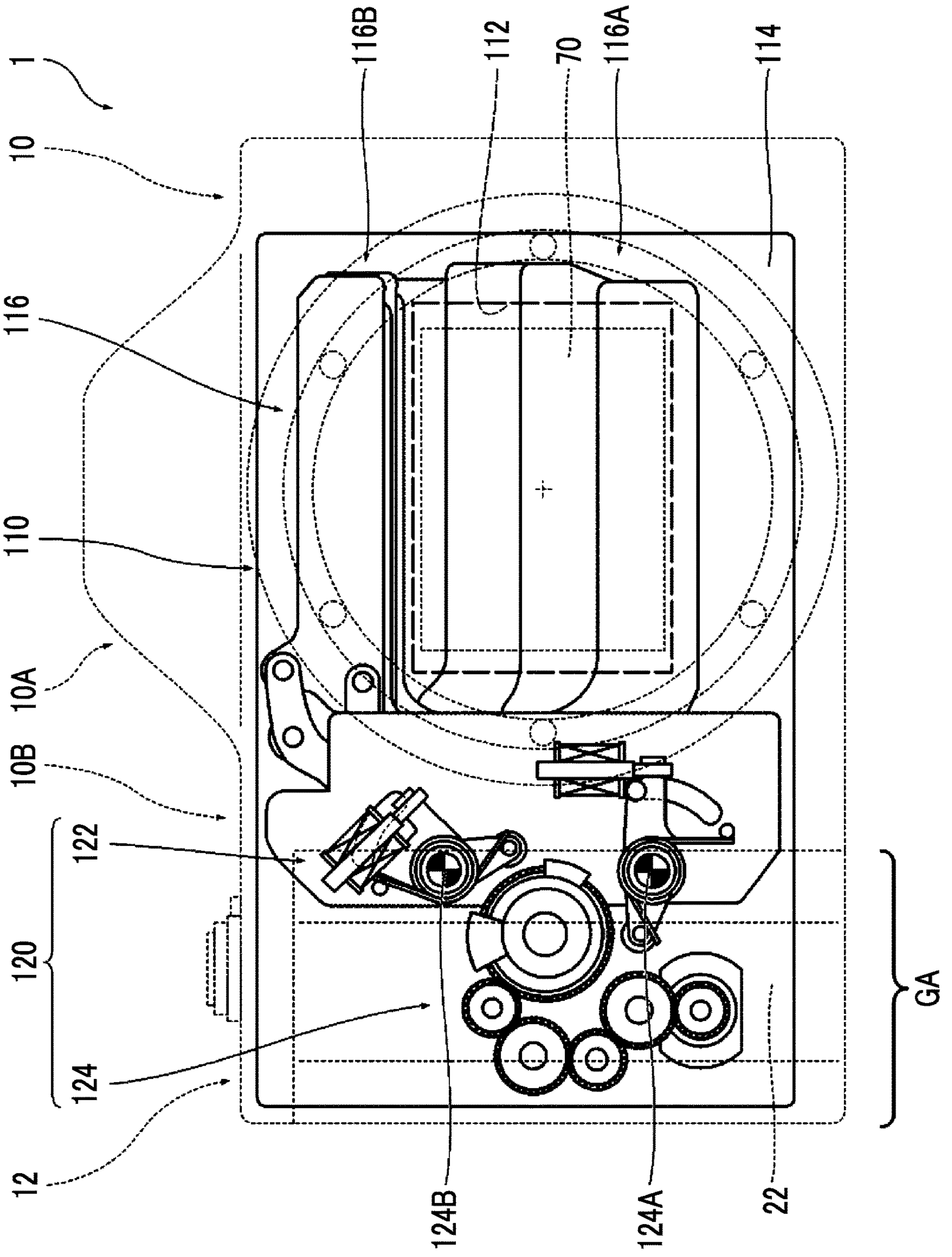
FIG. 10 is a front perspective view showing a structure in which the focal-plane shutter unit is disposed.

FIG. 10 is a front perspective view showing a structure in which the focal-plane shutter unit is disposed.

As shown in FIG. 10, the charge section 124 of the focal-plane shutter unit 110 is disposed in a range GA of the grip portion 12. Particularly, in the digital camera 1 of this embodiment, the charge section 124 is disposed in the grip portion.

<<Action>>

As described above, the drive section 122 and the charge section 124 of the focal-plane shutter unit 110 are disposed in parallel in the digital camera 1 of this embodiment. Accordingly, the drive unit 120 for the focal-plane shutter unit can be made compact, and a stable operation can be performed even in a case in which the shutter curtain is to be charged with large torque.

Further, in the digital camera 1 of this embodiment, the charge section 124 of the focal-plane shutter unit 110 is disposed in the grip portion 12. Accordingly, since a portion of the camera body close to the center of rotation of the shutter curtain 116 can be gripped at the time of handheld imaging, vibration to be generated at the time of operation of the shutter can be effectively suppressed. That is, the major cause of vibration to be generated at the time of operation of the shutter is moment that is received at the time of braking of the shutter curtain 116. This moment is generated about the center of rotation of the shutter curtain 116. Since a portion of the camera body, which is close to the center of rotation of the shutter curtain 116, is gripped, an influence of moment can be suppressed. Accordingly, the generation of vibration can be effectively suppressed.

Further, in the digital camera 1 of this embodiment, the battery 92, which is a heavy object, is disposed at the end portion of the camera body opposite to the grip portion 12. Accordingly, since the moment of inertia about the grip portion 12 can be increased, the generation of vibration can be more effectively suppressed.

That is, the generation of vibration can be effectively suppressed in the digital camera 1 of this embodiment by the synergy of the layout of the focal-plane shutter unit 110 where a portion of the camera body close to the center of rotation of the shutter curtain 116 is gripped and the layout of the battery 92 where the moment of inertia about the grip portion 12 is increased.

This will be described in more detail. Since the center of rotation of the shutter curtain 116 is made close to the grip portion 12 and the battery 92 is disposed on the side opposite to the grip portion 12, the battery 92, which is a heavy object, can be disposed at a position distant from the center of rotation of the shutter curtain 116. Even though mass points have the same mass, the moment of inertia of the mass point, which is more distant from the center of rotation, about a rotation axis is larger. Accordingly, in a case in which the battery 92, which is a heavy object, is disposed at a position distant from the center of rotation of the shutter curtain 116, rotational moment about the drive shaft (rotating shaft) of the shutter curtain 116 (rotational moment about an axis parallel to the optical axis) can be increased. Since vibration, which is caused by the operation of the shutter, is generated about the drive shaft of the shutter curtain 116, the moment of inertia in a direction where vibration caused by the operation of the shutter is to be suppressed can be increased by an increase in the rotational moment about the drive shaft of the shutter curtain 116. As a result, it is possible to make it difficult for vibration, which is caused by the operation of the shutter, to be transmitted to the camera body. Accordingly, the generation of vibration can be effectively suppressed.

Particularly, since the charge section 124 and the drive section 122 are disposed in parallel, an effect of charging the shutter curtains by a stable operation is also obtained while the focal-plane shutter unit 110 can be made compact.

Further, since the battery 92 is disposed between the image sensor 70 and the display unit 100, an effect of reducing the dimension of the camera body 10 in the lateral direction is obtained. On the other hand, the thickness of the camera body 10 is increased, but excellent gripping ability can be ensured since the grip portion 12 is formed to be thinner than the body portion 10A.

Furthermore, since the battery cover 40 is provided on the side surface of the camera body 10 and the battery 92 is adapted to be loaded in the battery chamber 90 in the lateral direction, an operation for replacing the battery 92 can be easily performed.

<<Modification Example>>

<Digital Camera>

An example of a case in which the invention is applied to a lens-interchangeable digital camera has been described in the above-mentioned embodiment, but the application of the invention is not limited thereto. The invention can also be applied to a digital camera integrated with a lens.

An example of a case in which the invention is applied to a non-reflex digital camera has been described in the above-mentioned embodiment, but the invention can also be applied to a reflex digital camera.

The invention particularly effectively acts in a case in which the invention is applied to a reflex digital camera. Since a mirror box, a pentaprism, and the like are not provided in the case of a non-reflex digital camera, the entire non-reflex digital camera is reduced in weight. Vibration to be generated at the time of operation of the shutter becomes significant as the camera is reduced in weight. The invention where vibration to be generated at the time of operation of the shutter can be effectively suppressed particularly effectively acts in the case of a non-reflex digital camera.

<Focal-Plane Shutter Unit>

An example of a case in which each of the front curtain and the rear curtain of the shutter curtain includes four shutter blades has been described in the above-mentioned embodiment, but the number of shutter blades of each of the front curtain and the rear curtain is not limited thereto. The number of shutter blades of each of the front curtain and the rear curtain can be appropriately increased or reduced according to the size of the exposure aperture, or the like.

Further, each of the drive section and the charge section can be adapted to be unitized and assembled with the base plate.

<Battery>

The shape of the battery has been the shape of a rectangular parallelepiped in the above-mentioned embodiment, but the shape of the battery is not limited thereto. The shape of the battery may be the shape of a plate or a cylindrical shape.

Further, one battery has been adapted to be loaded in the camera body in the above-mentioned embodiment, but a plurality of batteries can also be adapted to be loaded.

EXPLANATION OF REFERENCES

1: digital camera
2: lens
10: camera body
10A: body portion
10B: projecting portion
12: grip portion
14: lens mount
16: main display
18: sub-display
20: electronic view finder
20A: eyepiece portion
22: grip
24: thumb rest
30: shutter button
40: battery cover
70: image sensor
80: main board
82: cut-out portion
90: battery chamber
90A: battery insertion opening
92: battery
100: display unit

110: focal-plane shutter unit
112: exposure aperture
114: base plate
116: shutter curtain
116A: front curtain
116B: rear curtain
116*a*: shutter blade
116*b*: shutter blade
118B: rear curtain-drive arm
120: drive unit
122: drive section
124: charge section
124A: front curtain-drive shaft
124B: rear curtain-drive shaft
126A: front curtain-drive lever
126B: rear curtain-drive lever
126*a*: front curtain-drive pin
126*b*: rear curtain-drive pin
128A: front curtain-biasing spring
128B: rear curtain-biasing spring
130A: front curtain-electromagnet
130B: rear curtain-electromagnet
132A: spring bearing
132B: spring bearing
134A: spring bearing
134B: spring bearing
136A: magnetic piece
136B: magnetic piece
140: charge lever
140A: front curtain-charge lever
140B: rear curtain-charge lever
140C: charge gear
140D: rotating shaft
142: charge motor
144: rotation transmission mechanism
146A: roller
146B: roller
148: drive gear
GA: range
L: optical axis

What is claimed is:

1. A digital camera comprising:

a camera body that has an approximately rectangular shaped body and includes a grip portion at one end portion thereof, a grip side surface of the camera body being entirely included in the grip portion, the grip portion configured to receive a hand of a user to grip the camera body at a time of handheld imaging;

a lens or a lens mount that is provided on a subject side surface of the camera body;

a display unit that is provided on an imaging side surface of the camera body;

an image sensor that is provided in the camera body;

a focal-plane shutter unit which is square and includes a base plate including an exposure aperture, a shutter curtain opening and closing the exposure aperture, a drive section driving the shutter curtain in an openable and closable manner, and a charge section charging a driving force of the drive section and disposed at one end portion of the base plate along a widthwise direction that is orthogonal to an optical axis direction and is orthogonal to the grip side surface of the camera body, the focal-plane shutter unit being disposed immediately in front that is a subject side of the image sensor in the camera body and the charge section being disposed inside the grip portion when seen from the optical axis direction, and the charge section and the drive section of the focal-plane shutter unit being disposed in parallel; and a battery of which an entire portion is disposed between a plane including a side of the image sensor opposite to the subject side of the image sensor and a plane including a subject side of the display unit in the camera body, and is disposed at an end portion of the camera body that is opposite in the widthwise direction to the end portion of the camera body including the grip portion, wherein the grip portion includes a protruding portion protruding toward the subject side and functions as a finger hook.

2. The digital camera according to claim 1, wherein the camera body includes a body portion thicker than the grip portion, the lens or the lens mount is disposed on a subject side surface of the body portion, the display unit is disposed on an imaging side surface of the body portion, and the image sensor and the battery are disposed within a range of the body portion.

3. The digital camera according to claim 1, further comprising:

a battery chamber that is provided in the camera body and stores the battery, wherein the battery is stored in the battery chamber.

4. The digital camera according to claim 3, wherein the camera body includes a battery insertion opening that is provided on an end face of the end portion of the camera body opposite to the end portion of the camera body including the grip portion and is used to load the battery in the battery chamber.

5. The digital camera according to claim 3, wherein the camera body includes a cover part that is provided on an end face of the end portion of the camera body opposite to the end portion of the camera body including the grip portion and opens and closes the battery chamber.

6. The digital camera according to claim 1, further comprising:

a board on which an electronic component is mounted, wherein the board is disposed between the image sensor and the display unit in the camera body and includes a cut-out portion provided at a position of the battery to be disposed.

7. The digital camera according to claim 1, wherein the charge section of the focal-plane shutter unit is disposed in the grip portion.

8. The digital camera according to claim 1, wherein the image sensor has a sensor size that is larger than that of an image sensor having a 35 mm-format full size.

9. The digital camera according to claim 8, wherein the image sensor is an image sensor having a medium-format size.

10. The digital camera according to claim 1, wherein the digital camera is a non-reflex digital camera.

* * * * *